March 21, 1967 W. SIMON 3,309,958
FLYING SPOT SYSTEM FOR COMPARING AN OBJECT WITH TOLERANCE MASKS
Original Filed Dec. 18, 1961 3 Sheets-Sheet 2

INVENTOR.
WILLIAM SIMON
BY
Ezekiel Wolf, Wolf + Greenfield
ATTORNEYS

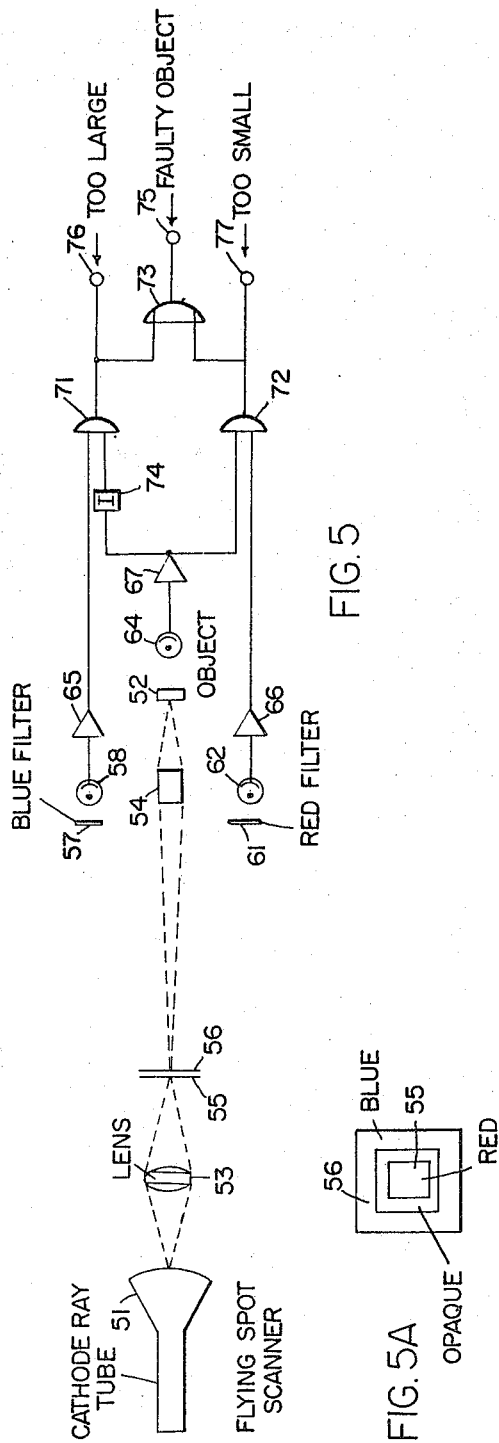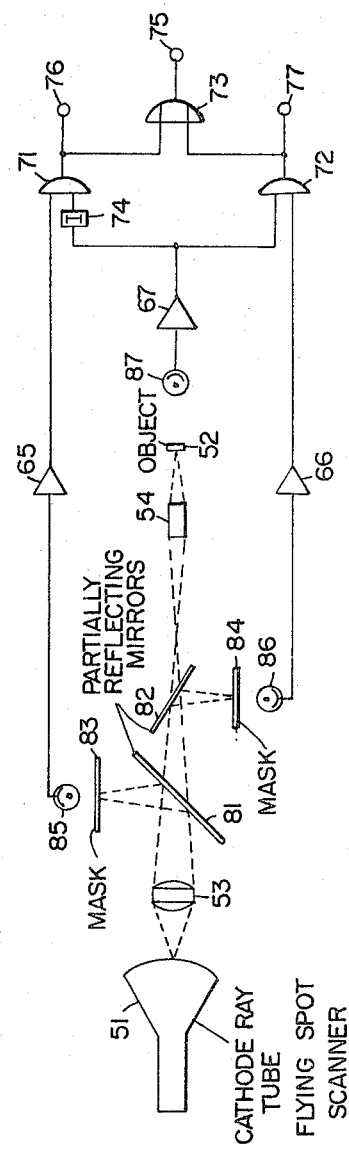

United States Patent Office 3,309,958
Patented Mar. 21, 1967

3,309,958
FLYING SPOT SYSTEM FOR COMPARING AN OBJECT WITH TOLERANCE MASKS
William Simon, Cambridge, Mass., assignor to Image Instruments, Inc., Newton Lower Falls, Mass., a corporation of Delaware
Continuation of application Ser. No. 159,829, Dec. 18, 1961. This application Oct. 11, 1965, Ser. No. 500,474
15 Claims. (Cl. 88—14)

The present invention relates in general to optical systems and more particularly concerns a system for checking the physical dimensions of an object by comparing the shadow of the object with suitable masks defining acceptable dimensional limits. This application is a continuation of my application Ser. No. 159,829, filed Dec. 18, 1961.

It is an important object of the present invention to provide a method and means for rapidly and accurately determining whether critical dimensions of an object fall within predetermined minimum and maximum tolerances.

It is another object of the invention to achieve the preceding object with optical techniques facilitating simultaneously determining by means of "go" and "no-go" tests whether the critical object dimensions are within minimum and maximum tolerances.

It is still another object of the invention to achieve the preceding objects with methods and means sufficiently flexible so that numerous different types of objects may be accurately checked with but slight changes in the apparatus requiring but a small additional expenditure.

According to the invention, a source of energy rays having a wavelength shorter than dimensional errors to be detected illuminates the object subject to said errors. The illumination from said source establishes an outline of the object. This arrangement coacts with means defining at least one acceptable dimensional limit of the object by selectively transmitting energy to radiant-energy-responsive means. This transmitted energy is representative of the relation of the object to said acceptable dimensional limit. The radiant energy responsive means provides a signal representative of the relationship between the actual dimension of the object and the acceptable limit.

According to one aspect of the invention, the illuminating source casts a sharply defined shadow of the object upon the mask so that when the object dimension is greater than a prescribed minimum limit, the shadow covers certain energy ray transmissive areas of the mask to prevent energization of the radiant energy responsive means, such as a photocell, but if the dimension of the object is less than the minimum allowable dimension established by the mask, the photocell is energized and provides a reject signal.

According to another aspect of the invention, means are provided for establishing a bright shadow so that when the dimensions of the object exceed a predetermined maximum limit established by a maximum limit mask, a radiant energy responsive means, such as a photocell, is energized to provide a reject signal.

According to still another aspect of the invention, means are provided for producing a dark image on a minimum limit mask and a bright image on a maximum limit mask so that maximum and minimum limit tests are conducted simultaneously.

A feature of the invention resides in the means for producing the bright image. The image of the object is focused upon outline-responsive means, the source illuminating the object providing a first type of energy rays, such as infrared, which define the outline on the outline-responsive means. The outline-responsive means emits a second type of energy rays, such as green light, when energized by a third type of energy rays, such as ultraviolet light. However, energizing the outline responsive means with both first and third type energy rays inhibits the emission of said third type rays. A source of said second type energy rays illuminates the area of the outline-responsive means both within and without the outline.

According to an aspect of the invention, the source of radiant energy comprises a moving spot of light, such as that provided by a flying spot scanner. A feature of this aspect of the invention resides in the enhancement of system resolving powers permitting reliable detection of minute deviations from acceptable tolerances introduced by tiny nicks or burrs.

Other features, objects and advantages of the invention will become apparent from the following specification when read in connection with the accompanying drawing in which:

FIGS. 5 and 6 show embodiments of the invention incorporating flying spot scanning techniques; and FIG. 5A shows a color filter mask for use with a flying spot scanner.

Figure 1:
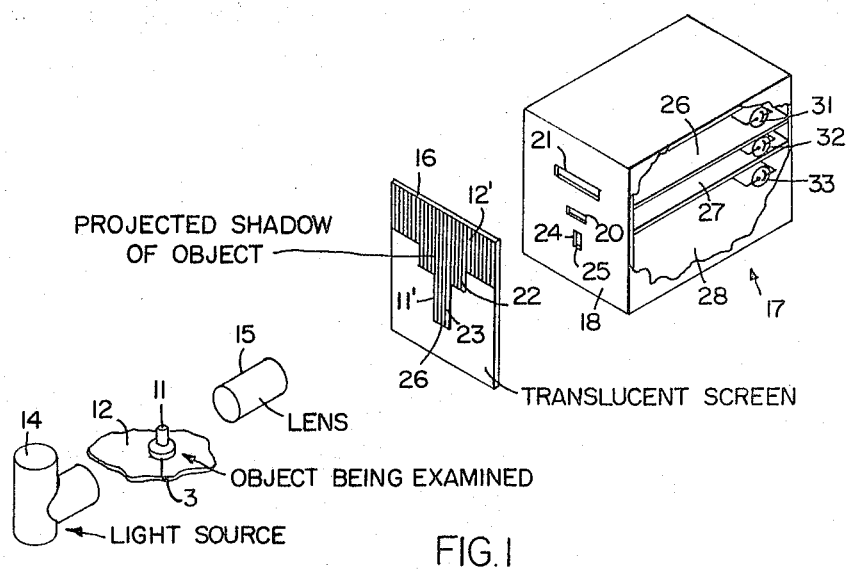
FIG. 1 shows a pictorial representation of a system according to the invention for obtaining a response from a photocell when the projected shadow of an object being examined fails to fully cover a light transmissive area in a mask.

With reference now to the drawing and more particularly FIG. 1 thereof, there is illustrated an exemplary embodiment of a system according to the invention in which the object being examined is a pin 11 positioned in a predetermined location on a flat surface 12. The particular means for accurately positioning the object is not a part of this invention and is not described herein so as not to obscure the inventive concepts. However, the object may be manually positioned centrally within a circle inscribed upon the surface 12. Of course, any of the numerous well-known means for accurately positioning an object may be employed. Alternatively, the object may only be roughly positioned and the mask accurately positioned. However, it is preferred to initially adjust the mask for an object of known standard dimensions and thereafter maintain the mask stationary while sequentially positioning a series of objects in a precise location.

A light source 14 illuminates the pin 11 so that the outline of the latter is focused by a lens 15 upon a translucent screen 16 to cast a shadow 11' of the pin 11 and a shadow 12' of the surface 12 upon the screen 16. A light-tight box 17 having a masking face 18 is positioned immediately behind the transparent screen 16 with the major diameter slot 21 centered within the cap 22 of the T-shaped shadow 11', the stem diameter inner limit slit 20 centered within the stem portion 23 of the T-shaped shadow 11' and the lower length limit slit 24 centered along the longitudinal axis of the stem 23 with the lower edge 25 of slit 24 corresponding to the lower edge 26 of stem 23. Box 17 and screen 16 are shown separated in FIG. 1 to more clearly illustrate details of the masking face 18. In terms of the focusing properties of lens 15, the masking face 18 and the outline of the pin 11 each embrace respective planes which substantially include respective conjugate foci of lens 15.

The slits 21, 20 and 24 open into respective light-tight compartments 26–28 each having respective photocells 31–33 located therein with suitable leads for coupling the photo-electrically derived output signals from each photocell to external circuits. Since the external circuitry associated with each photocell is well-known in the art, these circuits have not been shown in FIG. 1.

Having described the physical arrangement of the system, its mode of operation will be described. As stated above, the optical system projects the shadow of the pin 11 upon the screen 16 to define the limits of the pin outline. If the diameter of the cap 22 is greater than a predetermined inner limit corresponding to the length of slit 21, the entire area of slit 21 is shadowed and insufficient light enters chamber 26 to evoke a response from photocell 31. On the other hand, if cap 22 does not fully shadow slit 21, light enters chamber 26 to activate a response from photocell 31 indicating that the cap diameter is too small.

In a similar manner, complete shadowing of slit 20 indicates that the stem diameter of pin 11 is greater than acceptable minimum corresponding to the length of slit 22 thereby preventing enough light from entering chamber 27 to evoke a response from photocell 32. Likewise, complete shadowing of slit 24 indicates that the pin length is greater than the predetermined limit corresponding to the bottom edge 25 of slit 24, thereby preventing enough light from entering chamber 28 and accordingly inhibiting photocell 33.

In the embodiment of FIG. 1, separate photocells are shown for each dimension measured. However, if the only information desired is whether or not all three of the indicated dimensions exceed the minimum limits, only a single photocell in a box without compartments is required, and the failure of any of the slits to be fully shadowed allows light to enter the box and excite a response from the single photocell.

Figure 2:
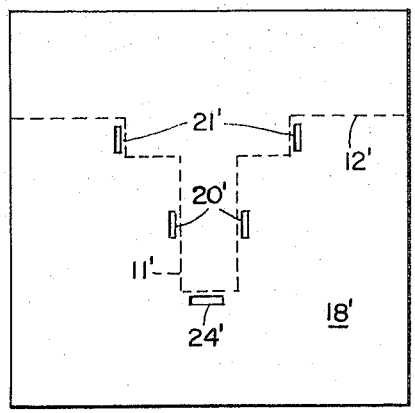
FIG. 2 is a view of the relationship between mask and shadow as seen from the photocell side of a mask arranged to reduce transmission of light when a predetermined maximum dimension is exceeded by an object being examined.

With reference to FIG. 2 there is shown a masking face 18' which may be substituted for masking face 18 when it is desired to obtain an indication of the pin dimensions exceeding predetermined maximum limits. The shadows of the pin and flat surface, 11' and 12' respectively, are represented by broken lines. A single horizontal slit 24' representing the pin length maximum limit exposes chamber 28 instead of the vertical slit 24 in FIG. 1. A pair of vertical slits 20' open into chamber 27 and define the maximum stem diameter limit. A pair of vertical slits 21' correspond to the maximum diameter of the cap of the pin 11. The nature of the photocell response indicative of a dimension exceeding the maximum allowable outside limit is different from that described above for indicating a dimension less than the minimum allowable limit. When a dimension is within tolerances, all the slits 21', 20' and 24' are unshadowed and the photocells maximally energized. However, when the shadow obscures any portion of a slit, the light entering the chamber is reduced and the photocell response falls off correspondingly. Thus, suitable means are provided for detecting a decrease in the photoelectrically activated output signal provided by a photocell to indicate exceeding the maximum allowable limit.

Although the technique described above may operate satisfactorily for sensing a dimension greater than a predetermined outer limit, improved reliability is obtained if a reject is indicated by the photocell being normally unenergized with light since the difference between no light and some light is a more precise indication than the difference between maximum and slightly less light intensity.

Figure 3:
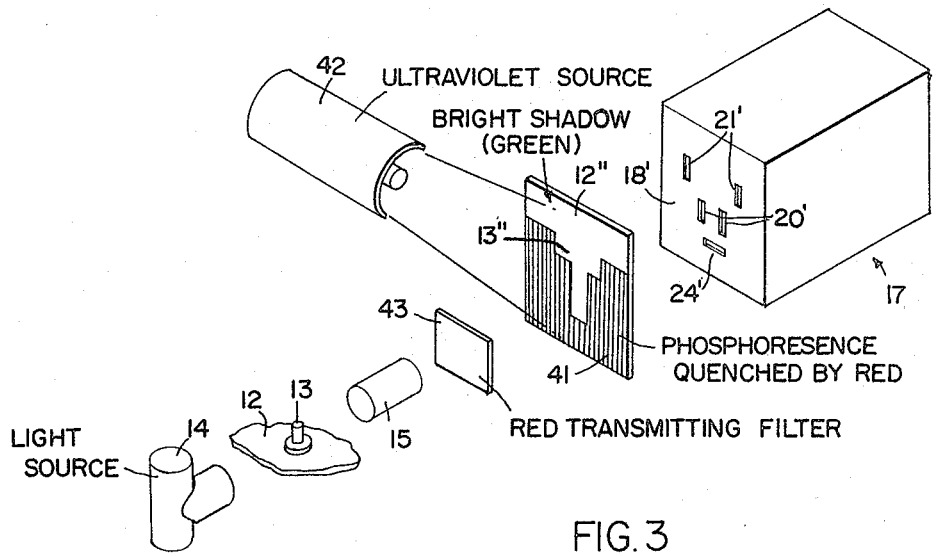
FIG. 3 shows an example of a system for creating a bright shadow of the object being examined.

Referring to FIG. 3, there is shown a system for examing the outline of the object to determine whether the dimensions of the object exceed predetermined outer limits by creating a bright shadow which energizes a photocell only when the object dimension exceeds the predetermined outer limit. The system for producing the bright shadow includes the light sourcre 14, the pin 13 situated on the flat surface 12, the lens 15 and the light tight box 17 with the outer limit mask 18' immediately adjacent to the phosphor-coated screen 41. The phosphor may be of a type which emits green light when excited by ultraviolet energy but is quenched by red light. A source 42 of ultraviolet energy illuminates the phosphorescent screen 41. A red transmitting filter 43 is between the lens 15 and the phosphor screen 41 so that the screen 41 is illuminated with red light except where the shadow 13" of the pin 13 and the shadow 12" of the flat surface 12 define the outline of the object 13.

The shadowed areas 12" and 13" are illuminated by ultraviolet energy but not red light; therefore these areas emit green light. The unshadowed area is prevented from emitting green light because this area is energized with red light transmitted through filter 43. Hence, the desired bright shadow is produced to activate a photocell in box 17 only when the pin diameter exceeds the predetermined maximum outer limit.

Figure 4:
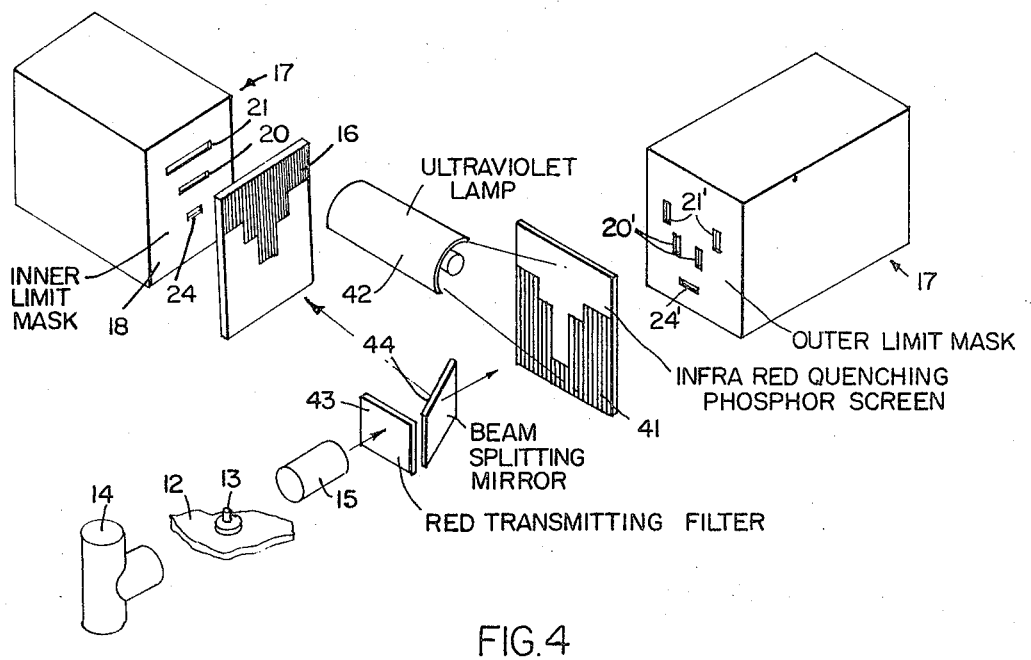
FIG. 4 shows a system for simultaneously producing both dark and bright shadows of an object being examined to simultaneously determine whether the examined object is within prescribed inner and outer tolerance limits.

Referring to FIG. 4, there is shown a system for simultaneously providing both a dark shadow image and a bright shadow image to simultaneously determine whether the pin being examined is within maximum and minimum allowable deviations from a prescribed normal. Basically, the system of FIG. 4 combines the features of the systems of FIGS. 1 and 3 while using but a single light source and lens. This is accomplished by using a beam splitting mirror 44 to transmit half the light energy to the screen 41 and reflect the remaining half of the light energy to the projection screen 16 where the bright and dark shadows, respectively, are produced. Thus the system facilitates rapidly examining a pin and identifying which of the pin dimensions are outside prescribed tolerances and in which direction.

Referring to FIG. 5, there is illustrated a diagrammatic representation of another system embodiment according to the invention utilizing a flying spot scanning system as the source of light. As is well-known, a flying spot scanning system incorporates a tiny rapidly moving light spot, such as on the screen of a cathode ray tube 51, as a light source for illuminating an object to be scanned. The flying spot from the cathode ray tube 51 is focused upon the object 52 to be scanned by a lens system comprising lenses 53 and 54.

The flying spot is also focused on one or more masks which, therefore, receive light simultaneously. This mask, or these masks, are used to define the maximum and minimum tolerance limits on the object. In the diagram of FIG. 5, the mask is in the light path between lens 53 and lens 54, and as a consequence, all of the light which reaches the object and that which reaches photocells 58, 62, and 64 must pass through the mask. In the arrangement of FIG. 6, the masks are arranged in a way such that the light illuminating the object does not pass through the mask. Whatever the arrangement, the system is such that one photocell produces one output whenever the flying spot is outside that boundary determining the maximum limit and another output whenever the spot is inside this limit. The second or inner monitoring photocell produces one output whenever the spot is within the limit determining the minimum acceptable dimensions, and another output whenever the spot is not within this region. The photocell behind the object products one output whenever the focused spot is passing the object being examined and another output whenever the light rays are intercepted by the object being examined. Also, the masking means and the outline of each object each embrace respective planes which substantially include respective conjugate foci of a lens system.

Stated otherwise, one photocell produces a particular output at those instants when the spot is outside of the outer limit line. If the object is not too large, the photocell that is arranged to receive the light which passes by the object will simultaneously be receiving light. If this instant-by-instant comparison is satisfied for all areas outside the outer limit, then the object is not larger than the outer limit, at any point.

The other (inner monitoring) photocell produces a particular output at all instants when the spot is within the inner limit. If the photocell behind the object receives light at any of the instants when the inner monitoring photocell reports that the spot is within the inner limit mask, then the object must be smaller than the inner limit. One can see then that this technique permits a point-by-point time-sequential comparison of the object with the inner and outer limit lines on the mask or masks.

This will be better understood by an examination of FIGS. 5 and 5A in which a flying spot of light such as is generated by a cathode-ray tube is imaged by lens 53 on the mask assembly 55, 56. Part of the light goes through red filter 61 to photocell 62; part of the light goes through blue filter 57 to photocell 58; part of the light goes through lens 54 and is imaged on object 52 and its surround. The light which passes by object 52 is received by photocell 64. The mask assembly 55, 56 comprises a blue filter 56 which occupies the region outside the outer limit line and a red filter 55 which occupies the area inside the inner limit line. It, therefore, happens that there will be blue light transmitted by this mask during those intervals of time when the spot is outside the outer limit; and therefore, output from photocell 58 during the time when the spot is outside the outer limit. Likewise there will be red transmitted when the spot is inside the inner limit line; and therefore, output from photocell 62 whenever the spot is inside the inner limit line. However, the intermediate region between the outside edge of region 55 and the inside edge of region 56 is opaque and suppresses all colors. Amplifiers 65–67 amplify the output signals from photocells 58, 62, and 64 respectively.

The output signals from these amplifiers condition logical elements in accordance with the following logic.

Let $W$ = Light received by photocell 64
$B$ = Light received by photocell 58
$R$ = Light received by photocell 62
$L$ = Object is too large
$S$ = Object is too small
$F$ = Object is too faulty In addition, let a logical "AND" be denoted by a dot and a logical "OR" by a plus sign. A logical negation will be denoted by placing a bar over the appropriate letter.

It is evident that the object is considered faulty if it is too large or too small. Hence:

$$F = L + S \quad (1)$$

If the object is too large, then there will be some instances of time when the photocell 64 will not receive light but photocell 58 will still be receiving blue light through its proper filter. Hence:

$$L = \overline{W} \cdot B \quad (2)$$

If the object is too small, then there will be some instances of time when the photocell 64 will receive light when photocell 62 is receiving light through its proper filter. Hence:

$$S = W \cdot R \quad (3)$$

Substituting Equations 2 and 3 into Equation 1

$$F = \overline{W} \cdot B = W \cdot R \quad (4)$$

The object will be considered faulty if Equation 4 produces a logical "YES" at any instant of time.

A logical design of Equation 4 is shown by gates 71, 72, 73 and inverter 74. Gates 71 and 72 are "AND" gates and gate 73 is an "OR" gate. If a logical "YES" occurs at 75 any time while the object is being scanned, then the object is faulty. Otherwise, there is no evidence of fault.

If it is desired to know whether the object is too large or is too small, the outputs at 76 and 77 may be monitored separately.

Rather than the red and blue filters shown in FIGS. 5 and 5A, one may use polarizing sheets so arranged that the light passing through the region of the mask outside of the outer limit line is polarized in one plane whereas that passing through the area within the inner limit mask is polarized in a perpendicular plane. Likewise, the filter in front of the photocells 58 and 62 may have polarizing film or equivalent such that one photocell receives the light which has passed through region 55. No filter would be placed in front of photocell 64, so that it would respond whether the light were in region 56 or in region 55. The intermediate region, which defines the acceptable tolerance range, will be an opaque region.

In addition to the indications when the object is too large or too small, the mask may be arranged simply to have regions which produce no output regardless of the size of the object, regions which may be designated "don't care." This would be done when inspecting an object for which some of the dimensions are not critical or of no concern. In the case of the red and blue filters first described, the machine would make no decision for any region of the mask which is opaque. In the case of the crossed-polarizing filters with the opaque tolerance region, the machine makes no decision for those regions of the mask which are opaque.

Referring to FIG. 6, there is shown still another embodiment of the invention incorporating partially reflecting mirrors 81 and 82. Lens 53 functions to focus the flying spot on both an outer limit mask 83 and an inner limit mask 84 while lens 54 coacts with lens 53 to focus the spot upon object 52. Photocells 85 and 86 receive light through masks 83 and 84, respectively. Photocell 87 receives light around object 52. Amplifiers 65, 66 and 67 are associated with photocells 85, 86, and 87, respectively and energize logical elements 71–74 with the same logic as described above in connection with FIG. 5.

There has been described an exemplary embodiment of a system for examining the dimensions of a pin. It is evident that more complicated shapes of parts may be examined in accordance with the principles of the invention by conforming the mask slits in accordance with the shape of the object being examined. Different techniques may be used for producing both the bright and the dark shadows within the principles of the invention. For example, the object may be scanned with a flying spot scanner and the shadow inverted electronically and reproduced on one television tube while the uninverted shadow is reproduced on another television tube, the mask being placed over the face of the television tube.

Numerous other modifications of, uses of and departures from the specific embodiments described herein may now be practiced by those skilled in the art without departing from the inventive concepts. Consequently, the invention is to be construed as limited only by the spirit and scope of the appended claims.

What is claimed is:

1. Optical inspection apparatus comprising means to provide illumination in the form of a spot of light, means to scan said spot in a series of sequential lines to cover an area, means to bring light from said spot to a focus on an object under observation and on mask means determining maximum and minimum acceptable limits of dimensions of the object, said mask means comprising first and second masking members each located in a path of said light, each member having a region which substantially passes said light and a region which substantially blocks said light, each of said regions having an outline which corresponds to the shape of said object, one of said outlines being larger than the other so that said one outline defines said maximum limits and said other outline defines said minimum limits, means to receive the light from said spot passing said object and means to receive light from said spot passing the masking means, said receiving means each being arranged to provide signals corresponding to the light picked up, and means responsive to said signals to provide a further signal indicative of the point-by-point relationship of the object with said limits.

2. Optical comparison apparatus comprising, a source of a moving light spot, masking means defining maximum and minimum limits of acceptable tolerances of dimensions of an object for selectively transmitting light energy originating from said source to provide a plurality of light signals each having a characteristic related to the contemporary position of said moving spot relative to said masking means, means for focusing said spot upon said masking means and upon the object being examined, said mask means comprising first and second masking members each located in a path of said light, each member having a region which substantially passes said light and a region which substantially blocks said light, each of said regions having an outline which corresponds to the shape of said object, one of said outlines being larger than the other so that said one outline defines said maximum limits and said other outline defines said minimum limits, photoelectric transducing means responsive to said light signals for providing an indication of said light spot being focused upon an object within said acceptable tolerances and for providing an indication of said light spot being focused upon an object outside said acceptable tolerances, and means responsive to said light signals for providing a signal indicative of the status of an object with respect to said acceptable tolerances.

3. Optical inspection apparatus as claimed in claim 1 including logic circuit means to provide said further signal indicative of the point-by-point relationship of the object with said limits.

4. Optical comparison apparatus in accordance with claim 3 wherein said logic circuit means includes means for providing a signal representative of an object dimension being less than a predetermined minimum and for prividing a signal representative of an object dimension being greater than a predetermined maximum at a plurality of points on said object.

5. Optical inspection apparatus as claimed in claim 1 in which each of said means to receive light comprises photoelectric transducing means.

6. Optical inspection apparatus as claimed in claim 5 including logic circuit means to provide said further signal indicative of the point-by-point relationship of the object with said limits.

7. Optical comparison apparatus in accordance with claim 6 wherein said photoelectric transducing means comprises, first, second and third photocells, first means for directing a first of said light signals upon said first photocell when said light spot is imaged at a point which corresponds to an object outside a predetermined maximum object dimensional limit, second means for directing a second of said light signals upon said second photocell when said light spot is imaged at a point which corresponds to an object inside a predetermined minimum object dimensional limit, and third means for directing a third of said signals upon said third photocell when said light spot is imaged at a point located between said maximum and minimum object dimensional limits.

8. Optical comparison apparatus in accordance with claim 7 wherein said logical circuit means comprises, a first "AND" gate having first and second input legs, means for coupling said first input leg to said first photocell and said second input leg to said third photocell so that said first gate produces an assertion when said first photocell receives said first light signal while an object obstructs said third photocell from receiving said third light signal.

9. Optical comparison apparatus in accordance with claim 7 wherein said logical circuit means comprises, an AND gate having first and second input legs, means for coupling said first and second input legs to said second and third photocells respectively so that said gate is conditioned when said second and third photocells simultaneously receive said second and third light signals respectively.

10. Optical comparison apparatus in accordance with claim 8 wherein said logical circuit means further comprises, a second AND gate having a pair of input legs, means for coupling respective ones of the latter input legs to said second and third photocells respectively so that said second gate is conditioned when said said second and third photocells simultaneously receive said second and third light signals respectively.

11. Optical comparison apparatus in accordance with claim 10 wherein said logical circuit means further comprises, an output terminal, and a buffer coupling the outputs of said first and second gates to said output terminal to provide a reject signal when either of said first and second gates is conditioned.

12. Optical means to examine dimensions of a shadowgraphic projection of an object comprising, masking means defining maximum and minimum limits of acceptable tolerances of said dimensions, light means and light focusing means to focus a spot of light upon said masking means and upon the object being examined to scan a plurality of spots of said masking means and simultaneously to scan corresponding spots of said object when said object occupies a given location, said mask means comprising first and second masking members each located in a path of said light, each member having a region which substantially passes said light and a region which substantially blocks said light, each of said regions having an outline which corresponds to the shape of said object, one of said outlines being larger than the other so that said one outline defines said maximum limits and said other outline defines said minimum limits, said masking means adapted selectively to provide a plurality of light signals each having a characteristic related to one of said limits at each spot of said masking means, first means disposed to receive said light signals, second means disposed to receive scanning light passing through said location, said first and second means being so arranged that when said object is present in said location, said first and second means provide a spot-by-spot indication of said dimensions relative to said masking means.

13. Optical inspection apparatus according to claim 1 in which said first and second masking members are located in parallel planes in the same path of said light.

14. Optical inspection apparatus according to claim 1 including a first partially reflecting mirror for diverting a portion of light from said spot to a first subpath, said first masking member being in said first subpath, a second partially reflecting mirror for diverting a portion of light from said spot to a second subpath, said second masking means being in said second subpath, and signal responsive means in each of said subpaths, the remainder of said light being directed to said object.

15. Optical inspection apparatus according to claim 1 in which said region which substantially blocks said light is contained between said maximum and minimum limits.

References Cited by the Examiner
UNITED STATES PATENTS 3,224,322  12/1965  Westbrook _____ 88—14

JEWELL H. PEDERSEN, *Primary Examiner.*

RONALD L. WIBERT, *Examiner.*